Dec. 17, 1935.  F. PACHINGER ET AL  2,024,804

PISTON RING

Filed Sept. 2, 1933

Inventors
Frank Pachinger,
Arthur H. Otersen and
Daniel Helmer
By Fisher, Moser + Moore
Attorneys Patented Dec. 17, 1935

2,024,804

UNITED STATES PATENT OFFICE 2,024,804

PISTON RING

Frank Pachinger, West Dover, and Arthur H. Otersen and Daniel Helmer, Cleveland, Ohio Application September 2, 1933, Serial No. 688,042

2 Claims. (Cl. 309—31)

The present invention relates to improvements in piston rings adapted for use with pistons, and our object in general is to provide a self-sealing piston ring which may readily be applied wherever required to form and maintain exceptionally efficient sealing relations between a piston and its cylinder.

Another object is to provide a piston ring which is particularly constructed to expand when the cylinder is under compression, so that there can be no leakage of pressure and explosive force past the piston.

A further object is to provide a piston ring which will be unitary in action, that is, which will operate as a single ring, for mounting and adjusting purposes but which is provided with a circumferential sealing member arranged in a recessed portion of the inner wall of the ring and seated upon a circumferential shoulder formed by said recessed portion. As an exemplification of a preferred form or forms of the invention, reference may be had to the accompanying drawing and description.

Thus Figure 1 of the drawing represents a sectional view of an internal combustion engine embodying a piston provided with several of my improved sealing rings;

Figure 1:
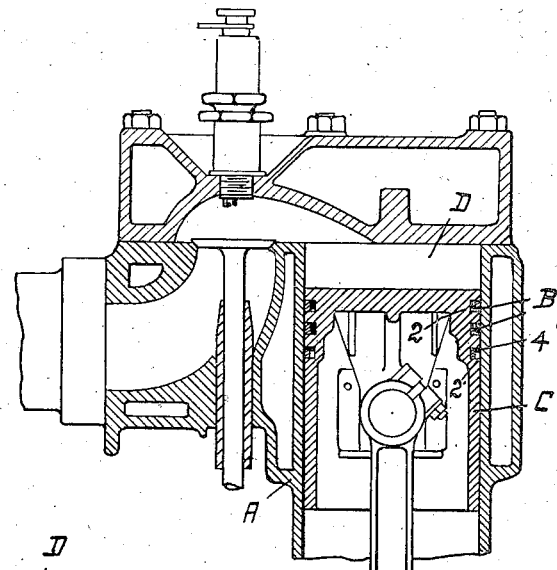
Figure 2:
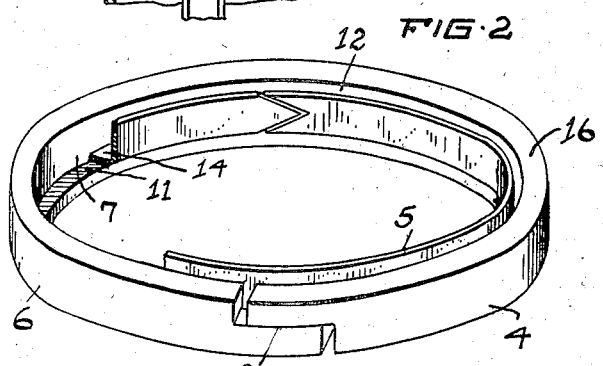
Figure 2 is a perspective view of a ring constructed according to my invention.

The internal combustion engine A shown in Figure 1 merely exemplifies one type of engine in which the present invention may be used, and the invention resides in the piston rings B, which occupy the annular grooves 2 in the piston body C, for the purpose of maintaining a tight joint between the engaging walls of the cylinder D and piston C. Such rings are usually provided with a lapped or stepped joint and the present ring may be constructed in any acceptable way with an overlapping joint 3, see Figure 2. Rings B which are somewhat larger in diameter than the bore of the cylinder so that when contracted and slipped into the cylinder they will possess a certain amount of spring and expand outwardly against the wall of the cylinder according to accepted practices, are made of two or more ring-shaped split members, comprising an outer ring member 4 and an inner ring member 5.

Outer ring member 4, preferably made of cast iron according to common practice, has external and internal parallel faces 6 and 7 respectively, and is formed with an inwardly extending circumferential flange 11, flush with the lower face 10 thereof. This flange affords a support for inner ring member 5, and also increases the sealing effect of lower sealing face 10 of the outer ring member and the lower face 17 of annular grooves 2.

Figure 3:
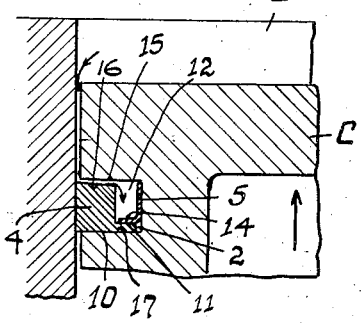
Figure 3 is an enlarged fragmentary cross sectional view through a piston within a cylinder showing the sealing action and circumferential expansion of the ring when under compression.
Figure 4:
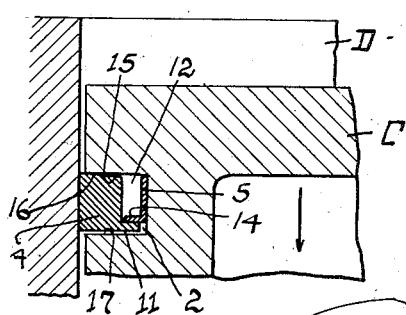
Figure 4 is an enlarged fragmentary cross sectional view through a piston within a cylinder, showing the action of the ring during the suction stroke of the piston.
Figure 5:
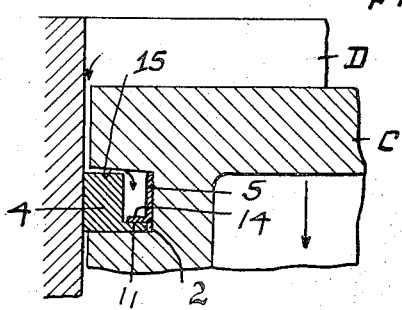
Figure 5 is a sectional view through a modified form of the sealing ring.

The ring member 5 is preferably made of approximately 26 gauge steel or brass, as the periphery of member 5 never comes in contact with the cylinder wall. This member 5 is provided with an outwardly extending circumferential flange 14, which flange seats upon and snugly engages the oppositely extending flange 11 of outer ring member 4. When assembled the two ring members 4 and 5 form a narrow channel 12, between their opposed spaced walls, into which gas from cylinder D may enter. The bottom of channel 12 is sealed by the outwardly extending narrow flange 14 of ring 5, and the upper end thereof is closed by the upper wall 15 of annular groove 2 in piston body C. Preferably the wall 15 is slightly inclined, see Figure 5, or the upper face 16 of ring 4 is inwardly chamfered as shown in Figures 3 and 4 to permit of communication between the channel 12 and the cylinder D, when the latter is under compression and/or the charge of the cylinder is exploded. In this case the charge seeps through the narrow space between the upper wall 15 of groove 2 and the upper face 16 of ring 4 into the channel 12, thus forcing the flange 14 of ring 5 into tight sealing engagement with the circumferential flange 11 of ring 4 and also forcing the wider sealing surface 10 of ring 4 against lower face 17 of groove 2, so that no leaking of gas past piston C is possible. The compressed gas in channel 12 at the same time acts upon the side walls of channel 12 and forces the external circular face 6 of ring 4 outwardly against the wall of the cylinder D and thus maintains a tight sliding fit against this wall. When the piston is on the suction stroke and the cylinder under vacuum, communication between channel 12 and cylinder D is cut off, see Figure 4, because the upper face 16 of ring 4 is forcibly seated against the upper wall 15 of groove 2 and thus seals the upper end of channel 12. The circumferential flange 11 of ring 4 which has been forced toward the flange 14 of ring 5 thus effects a tight seal between the two rings, as can readily be seen from inspection of Figure 4. When the gas pressure expands the external ring 4 of the improved self-sealing piston ring, piston C is axially alined with respect to the cylinder D because of the balanced radial pressure of the compressed gas in channel 12. This action prevents objectionable knocking of the piston against the cylinder walls, caused by wear of the cylinder.

The pressure of the piston ring surface against the cylinder wall depends upon compression of the charge in the cylinder and the compression of the cylinder depends upon the sealing action of the ring. Furthermore, as the internal sealing action of the ring is not materially affected by wear of the ring, the life of the latter is indefinitely prolonged. It can also readily be seen that the described sealing action of the ring insures constant and high engine compression and material savings in gas and oil consumption.

The piston ring may readily be used as an oil ring when installed in inverted position and without the inner sealing member 5, as shown in Figure 1, where it will be noted, the ring 4' seats within the groove 2' and effects a suction and spreading action of oil on the cylinder walls.

Figure 6:
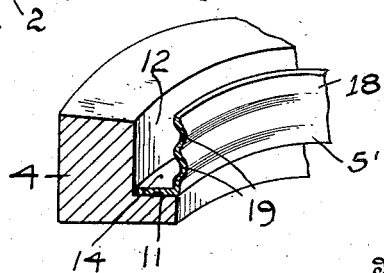
Figure 6 is a sectional view through another modified form of the sealing ring.

The modified form of the invention shown in Figure 6 includes the outer ring 4 with circumferential flange portion 11, and an inner ring 5' similar to ring 5 of the other figures. The vertical wall portion 18 of the inner ring 5' is horizontally corrugated as at 19 to permit of a vertical yielding movement of this portion and prevent vertical bodily movement of ring 5' in the groove 2 during the reciprocatory action of the piston in a cylinder.

It will be obvious that the piston ring is adapted for use in connection with pistons of machines other than combustion motors, such as valves, steam engines, pumps and kindred devices.

Having thus described our invention, what we claim is:

1. A piston ring comprising a cast iron external split ring of substantial thickness having an inwardly extending circumferential flange, a thin and yieldable split ring of less height than said first ring arranged within the latter, and an outwardly extending circumferential flange on said inner split ring for seating said ring upon the flange of said external split ring and circumferentially spacing said rings with respect to each other and for sealing the bottom of the annular space formed between the two rings.

2. A piston ring comprising a heavy external split ring of L-shaped cross section and a thin, internal split ring having an outwardly extending circumferential flange seated within said external ring upon the horizontal portion thereof, said internal ring having a circumferential vertical wall portion corrugated circumferentially, whereby it may yieldably change its height, the circumferential flanges of said rings being in sealing contact with each other and spacing the opposed walls of said rings from each other to form a circumferential channel between said rings.

FRANK PACHINGER.
ARTHUR H. OTERSEN.
DANIEL HELMER.